Feb. 18, 1958     H. R. SCHELP     2,823,516
DUCTED FAN POWER PLANT FOR AIRCRAFT
Filed Oct. 30, 1951
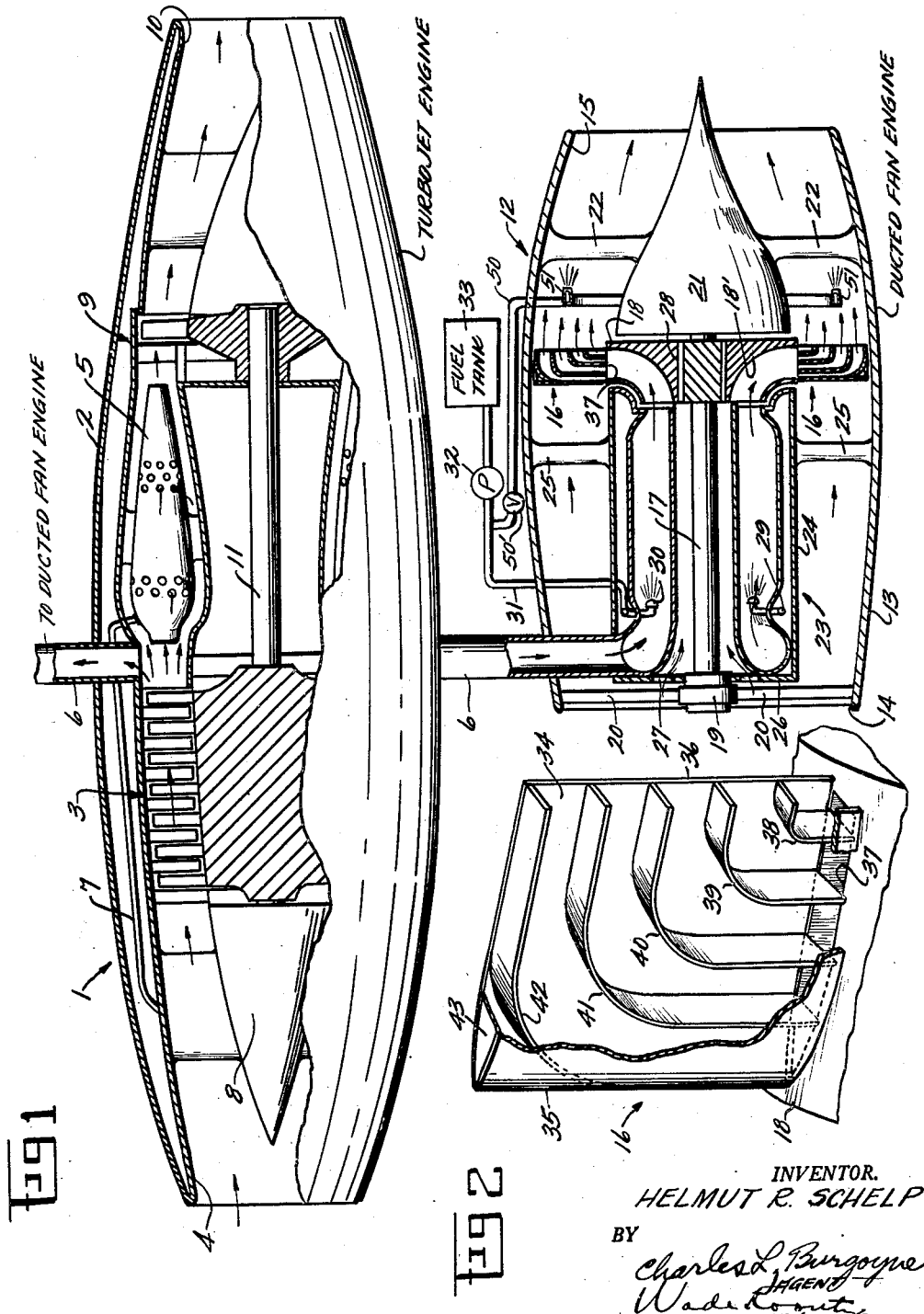
INVENTOR.
HELMUT R. SCHELP
BY
Charles L. Burgoyne.
AGENT
Wade Doonitz
ATTORNEY United States Patent Office 2,823,516
Patented Feb. 18, 1958

2,823,516

DUCTED FAN POWER PLANT FOR AIRCRAFT

Helmut R. Schelp, Pacific Palisades, Calif., assignor to The Garrett Corporation, a corporation of California Application October 30, 1951, Serial No. 253,945

4 Claims. (Cl. 60—35.6)

(Granted under Title 35, U. S. Code (1952), sec. 266)

The invention described herein may be manufactured and used by or for the United States Government for governmental purposes without payment to me of any royalty thereon.

The present invention relates to a ducted fan power plant for aircraft and particularly relates to a novel self-propelled compressor for use in a ducted fan power plant.

The primary object of the invention is to provide a ducted fan power plant for aircraft including a combustion unit supplied with compressed air from an outside source and including a self-propelled compressor or fan operable by means of the available energy in the air and products of combustion from the combustion unit to draw outside air through the ducted fan power plant along an annular passage, with the gas output of the self-propelled compressor being free to mix with the induced air flow through said annular passage, whereby the mass flow is increased to a maximum to provide a maximum thrust on the aircraft.

A further object of the invention is to provide an aircraft propulsion system including a conventional turbojet engine, having an air compressor, on the aircraft wherein means is provided to divert part of the compressed air from the air compressor to a combustion unit of an auxiliary ducted fan power plant and wherein the products of combustion of the combustion unit are used to operate a self-propelled fan to draw outside air through the ducted fan power plant along an annular passage, with the gas output of the self-propelled fan being vented through the fan to mix freely with the induced air flow through said annular passage, whereby the mass flow is increased to a maximum to provide a maximum thrust on the aircraft.

It is a further object of my invention to provide a ducted fan in which there is a blower for inducing a flow of air through a housing and in which the blower is composed of a rotor having substantially radial expansion passages on which is mounted a plurality of fan blades, the fan blades having channel means therein adapted to receive an expansible fluid from the expansion passages of the rotor, the outlet ends of the channel means comprising jet reaction means for driving or assisting in driving the blower.

The above and other objects of the invention will become apparent upon reading the following description in conjunction with the drawing, in which:

Fig. 1 is a schematic view in longitudinal cross section showing the present ducted fan power plant system for aircraft but not including any of the aircraft structure.

Fig. 2 is a perspective view of one blade of the ducted fan with most of the covering jacket removed from one side face of the blade.

In jet propulsion of aircraft the propulsion efficiency is a function of the speed differential and speed differential may be defined as the difference between the discharge velocity of gas flowing out of the engine and the aircraft flight velocity. As the speed differential increases the propulsion efficiency decreases. For example on take-off the speed differential is very high and the propulsion efficiency is low; thus the average jet propelled aircraft requires a long take-off run to develop speed and cause a gradual reduction in the speed differential before the aircraft becomes air-borne.

Another important factor in jet propulsion design is the thrust available with a given installation and aircraft. Since the thrust is derived quantatively by obtaining the product of the mass of the flowing gas and the speed differential, it will be seen that in a design where the speed differential is low to provide good propulsion efficiency the mass must be increased to increase the thrust to a desired extent.

In the present invention an aircraft propulsion system is disclosed which will increase the mass flow over that of known jet propulsion systems of analogous or similar types. The principal advantage is of course the desired increase in thrust, due to increased mass flow. Apart from any particular aircraft the invention is shown in Fig. 1 of the drawing. Preferably the central turbojet engine 1, used to assist the propulsive effort and supply compressed air to the ducted fan engines, is placed in the aircraft fuselage with the ducted fan engines located in outboard relation attached to the aircraft wings. However no such specific orientation with relation to an aircraft is required and for this reason the jet propulsion system will be described apart from the aircraft. The number of ducted fan engine units to be associated with the turbojet engine will depend on design considerations, such as relative size of the units and aircraft as well as the proportion of compressed air which can be diverted from the turbojet engine and still maintain this prime mover in normal operation.

The turbojet engine 1 of conventional construction includes an outer casing 2 enclosing an axial flow air compressor 3 receiving ram air through an anular air inlet 4 and discharging compressed air to the combustion chambers 5 arranged around the engine. However the engine is modified to the extent that compressed air diversion conduits 6 are provided ahead of the combustion section to carry compressed air to one or more ducted fan engines spaced from the turbojet engine and extending in a fore-and-aft relation in such a manner as to augment the propulsive effort of the turbojet engine. The combustion chambers 5 are supplied with liquid fuel by way of fuel lines 7 extending to pumping means housed in the engine accessory island 8. The heated and expanded gas from the combustion chambers flows through the single stage turbine 9 and thence to the atmosphere by way of the exhaust nozzle 10. The main drive shaft 11 transmits power developed by the turbine to the rotor of the air compressor 3.

One of the novel ducted fan units 12 is shown in section at the lower side of Fig. 1. This unit includes an outer casing or pod 13 receiving ram air at the forward or inlet end 14 and discharging air and products of combustion at the rearward or discharge end 15 in the same general direction as the similar gas flow from the turbojet engine 1. Air flow through the casing 13 is accelerated by means of a self-propelled fan 16 and therefore the unit 12 may be accurately termed a ducted fan engine.

The main difference between a turbojet engine and a ducted fan engine is that in the latter a larger amount of air is accelerated to a lower discharge velocity in order to improve the propulsion efficiency. This is usually achieved by the use of an additional fan driven by a gas turbine. The principal disadvantage of the presently known systems is that the ducted fan must be built around the gas turbine, thus resulting in a large diameter unit. Other difficulties are encountered with the gearing between the turbine and fan, resulting in excessive weight of the power plant and loss of efficiency in the gearing.

Supported centrally within the casing 13 is a rotating assembly including a main shaft 17 and a self-propelled fan 16 including a central rotor portion 18 rotatably mounted by means of the shaft so as to turn freely on the central longitudinal axis of the casing 13. At its forward end the shaft 17 is supported in a central bearing 19 carried on radially extending arms 20 secured to the casing 13. At the rearward end of the engine the shaft 17 is supported in a central bearing (not shown) enclosed inside the tail cone or bullet 21. The latter is mounted by means of radial arms 22 secured to the casing 13. Surrounding the central shaft 17 and extending longitudinally between the arms 20 and the self-propelled fan 16 is an annular combustion chamber 23 including an outer casing 24 of cylindrical form. Opening into the forward end of the annular chamber is one of the compressed air conduits 6. The chamber structure 23 is supported in the position shown by means of radial supporting arms 25 secured to the engine casing 13 at their outer ends and to the chamber casing 24 at their inner ends. In addition the forward end wall 26 rigidly connected to the casing 24 is also mounted on the shaft bearing assembly 19. A plurality of air passages 27 in the end wall 26 admit cooling air to the space interiorly of the chamber 23. Some of this air passes through the rotor element 18 by way of axial bores 28 to aid in cooling the rotor. The cooling air passing through the bores 28 may be used to some extent to cool the tail cone 21 but at least part of it escapes between the rotor 18 and cone 21. Arranged in a circular manner around the combustion chamber but within the outer casing 24 is a fuel distribution conduit 29 having radially extending branches or legs 30 entering the annular combustion space at selected intervals therearound. The branches have free end portions discharging atomized fuel into the combustion space. Fuel is fed to the distribution conduit 29 by means of the main fuel line 31 extending to a suitable pump 32 and fuel tank 33. In accordance with conventional practice the fuel may be ignited by a suitable igniter installed in the combustion unit 23.

The self-propelled fan or blower 16 is a single rotating assembly comprising the central rotor portion 18 and a plurality of radially extending fan blades. The rotor portion has formed therein a plurality of curved channels 18' which receive hot gases from the combustion chamber and turn the gas flow from an axial direction to a radial direction, so that the hot gases emerge through open end portions 37 of the channels for continued radial flow into the hollow fan blades and subsequent combining with the induced air flow through the casing 13 before being discharged through the annular exhaust nozzle 15. The augmented gas flow due to the volume of combustion products and air results in improved thrust characteristics over prior types of ducted fan propulsion systems.

The self-propelled fan assembly 16 is shown in greater detail in Fig. 2 of the drawing. Here it will be seen that the rotor portion 18 has secured thereto, as by welding for example, a hollow fan blade 34 of sheet metal. The blade is tapered off smoothly at its leading edge 35 and is open at the trailing edge where the edges 36 of the sheet metal wall are spaced apart to permit egress of combustion gases. Opening 37 at the outer end of one of the rotor channels 18 coincides with the lower open end of the blade structure. Within the hollow blade are several partition elements 38 to 42 adapted to form gas flow channels which change the direction of gas flow through an angle of about ninety degrees. The bends in the partitions are made on as large a radius as possible in order to reduce losses due to turbulence and friction. The upper or widest portion of the partition 42 serves to close most of the outer end of the hollow blade but in addition there is also a small segmental closure plate 43 in the region of the tapered leading edge of the blade. The thin metal partitions are secured to the walls of the blade 34 by welding or any other expedient. The plane of the blade is turned at an angle to the axial direction so as to make the blade effective in drawing air through the engine casing 13. Furthermore this same arrangement causes a reaction on the fan blades as the hot combustion products issue from the open trailing edge of the blade. This jet reaction acts to rotate the fan or blower assembly at a high rate of speed. Since the energy absorbed during expansion of the flowing gases through the self-propelled fan is only part of the total kinetic energy in the combustion products, there remains considerable energy in the gases as they issue from the respective fan blades and mix with the outside air flow through the casing 13. Thus further expansion will occur in the exhaust nozzle to give an added aircraft propulsive thrust. From the above statements relating to the mode of operation it will be understood that the hot gases generated in the combustion unit 23 serve a double purpose as follows:

(1) The hot gas expanding through the self-propelled fan assembly 16 produces a jet reaction on the fan blades to cause rapid rotation of the fan assembly and consequent flow of outside air through the casing 13.

(2) The hot gas issuing from the hollow blades increases the mass flow and available energy in the gas passing through the engine casing 13 along the annular path terminating at the gas discharge outlet 15.

The total number of fan blades used in any installation may vary considerably but it is understood that each hollow blade will preferably be connected at its inner end to one of the curved gas channels 18' in the rotor portion 18 of the fan assembly 16. While compressed air is supplied by the compressor of a turbojet engine in the illustrated system, it is to be understood that any other source of compressed air may be substituted if desired.

In order to provide additional thrust on the aircraft when desired the ducted fan unit 12 may include an afterburner. For this purpose a branch fuel line 50 is provided leading to a series of fuel nozzles 51 arranged around the annular space rearwardly of the fan 16. A valve 50' in the fuel line 50 is used to regulate the flow of fuel to the afterburner. When additional thrust is required, as at take-off for instance, the valve 50' is turned on to start the flow of fuel to the fuel nozzles 51. The fuel is ignited by the hot gases issuing from the hollow fan blades and the added heat causes heating and expansion of the gases and air flowing toward the exhaust nozzle 15. The added thrust is usually needed only for relatively short periods of time when additional speed or power output is desired, after which the control valve 50' may be shut off to conserve fuel. The self-propelled fan 16 will produce considerable turbulence or swirling of the air and gases flowing rearwardly toward the exhaust nozzle 15, thus aiding in the efficient combustion of the fuel fed to the afterburner.

The self-propelled fan or blower 16 must be carefully designed and constructed to provide an efficient jet power plant. For instance it is important that the longitudinal cross sectional area of each fan blade increase from the leading edge 35 to the open trailing edge 36, since the rotative thrust exerted by the hot gases is due to the rapid expansion of the heated gases as they flow from a relatively small space toward a relatively large space. It is also a design objective to achieve a discharge velocity of the hot gases at the trailing edge of the fan blade which is equal to or larger than the air velocity on the outer shell of the blade. The blower or compressor 16 includes the central rotor portion 18 and the hollow fan blades. The curved channels 18' in the central rotor portion are separated by blades or partitions and by proper design the central rotor will act as a radial flow gas turbine to provide part of the energy to compress the air by action of the self-propelled fan. In other words some of the shaft horsepower available to rotate the fan is delivered by the expansion of gases through the central rotor portion 18. At the same time the central rotor portion 18 functions to change the gas flow from an axial direction to an outward radial flow direction for direct entry into the fan blades.

The embodiment of the invention herein shown and described is to be regarded as illustrative only and it is to be understood that the invention is susceptible of variations, modifications and changes within the scope of the appended claims.

I claim:

1. In an aircraft propulsion system having, a turbojet engine housing having an air compressor, combustion chamber, gas turbine and exhaust nozzle all connected in series, conduit means connecting the said housing to a second housing to bleed a portion of the compressed air from said air compressor to an auxiliary propulsion unit contained within said second housing, which extends in spaced parallel relation with respect to said first housing, an annular combustion unit within said second housing connected to said conduit means, means for feeding liquid fuel to said combustion unit connected thereto, means supporting said combustion unit centrally of said second housing with an annular space between said unit and said second housing for the flow of atmospheric air therethrough, a self-propelled fan in said second housing rearwardly of said combustion unit and having a rotor portion receiving combustion products from said combustion unit, passage means in said rotor portion terminating in radially directed outlets, hollow fan blades extending radially from said rotor portion turned at an angle to axial direction and having channel means adapted to receive the gas flow from said radially directed outlets and direct said flow out of the blades along the trailing edges thereof and at an angle to axial direction, whereby the jet reaction of said gas flow acts forwardly against said self-propelled fan and also rotates said self-propelled fan and whereby the induced flow of outside air through said annular space has its mass and kinetic energy increased by the gas flow issuing from the trailing edges of the fan blades.

2. A jet propulsion power plant for aircraft comprising, a housing of generally circular cross section open at both ends, an annular combustion unit located centrally of said housing and spaced inwardly of the housing walls to provide an annular space through the housing for the flow of air therethrough, means for feeding liquid fuel to said combustion unit, means exteriorly of said housing and connected thereto for producing compressed air for flow along a suitable conduit to said combustion unit to support combustion of said fuel, a self-propelled fan in said housing rearwardly of said combustion unit and having a rotor portion receiving combustion products from said combustion unit, passage means in said rotor portion terminating in radially directed outlets, hollow fan blades extending radially from said rotor portion turned at an angle to axial direction and having channel means adapted to receive the gas flow from said radially directed outlets and direct said flow out of the blades along the trailing edges thereof and at an angle to axial direction, whereby the jet reaction of said gas flow acts forwardly against said self-propelled fan and also rotates said self-propelled fan and whereby the induced flow of outside air through said annular space has its mass and kinetic energy increased by the gas flow issuing from the trailing edges of the fan blades, and a cooling air passage extending centrally within the housing and connecting outside air with vents in the rotor portion.

3. A jet propulsion power plant for aircraft comprising, a housing of generally circular cross section open at both ends, a combustion unit located in said housing to provide a chamber extending part way through the housing for the flow of gas and for the combustion of fuel, an annular outside air flow chamber surrounding the combustion unit means for feeding liquid fuel to said combustion unit, means exteriorly of said housing and connected thereto for producing compressed air for flow along a suitable conduit to said combustion unit to support combustion of said liquid fuel, a self-propelled fan in said housing rearwardly of said combustion unit and having a rotor portion receiving combustion products from said combustion unit, passage means in said rotor portion terminating in radially directed outlets, hollow fan blades extending radially from said rotor portion turned at an angle to axial direction and having channel means adapted to receive the gas flow from said radially directed outlets and direct said flow out of the blades along the trailing edges thereof and at an angle to axial direction, whereby a combination of the turbine action of the passage means in said rotor portion and the jet action of the gas flow discharged along the trailing edge of the blades acts forwardly against said self-propelled fan and also rotates said self-propelled fan and whereby the induced flow of outside air through said housing has its mass and kinetic energy increased by the gas flow issuing from the trailing edges of the fan blades.

4. An aircraft propulsion system as defined in claim 3 wherein the outlets of said channel means of said fan blades are spaced in series along the trailing edges of said blades substantially on lines extending inwardly from the outer ends of the blades toward the axis of the fan.

References Cited in the file of this patent

UNITED STATES PATENTS

| | | |
|---|---|---|
| 608,377 | McIntosh | Aug. 2, 1898 |
| 814,190 | Davis | Mar. 6, 1906 |
| 1,038,400 | Linsmeyer | Sept. 10, 1912 |
| 2,364,189 | Büchi | Dec. 5, 1944 |
| 2,409,177 | Allen et al. | Oct. 15, 1946 |
| 2,568,726 | Franz | Sept. 25, 1951 |
| 2,580,962 | Sédille | Jan. 1, 1952 |
| 2,599,470 | Meyer | Jan. 3, 1952 |
| 2,592,938 | McNaught | Apr. 15, 1952 |
| 2,625,794 | Williams et al. | Jan. 20, 1953 |
| 2,667,226 | Doblhoff | Jan. 26, 1954 |

FOREIGN PATENTS

| | | |
|---|---|---|
| 477,449 | Great Britain | Dec. 30, 1937 |
| 586,572 | Great Britain | Mar. 24, 1947 |
| 648,107 | France | Aug. 7, 1928 |